(12) United States Patent
Chen et al.

(10) Patent No.: US 9,692,574 B2
(45) Date of Patent: Jun. 27, 2017

(54) METHODS AND DEVICES FOR DETECTING CONTROL SIGNALING AND IMPLEMENTING CONTROL SIGNALING DETECTION

(71) Applicant: ZTE Corporation, Shenzhen, Guangdong (CN)

(72) Inventors: Yijian Chen, Shenzhen (CN); Bo Dai, Shenzhen (CN); Zhisong Zuo, Shenzhen (CN); Jing Shi, Shenzhen (CN); Yong Li, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 10 days.

(21) Appl. No.: 14/430,608

(22) PCT Filed: Aug. 5, 2013

(86) PCT No.: PCT/CN2013/080854
§ 371 (c)(1),
(2) Date: Mar. 24, 2015

(87) PCT Pub. No.: WO2014/044086
PCT Pub. Date: Mar. 27, 2014

(65) Prior Publication Data
US 2015/0249528 A1 Sep. 3, 2015

(30) Foreign Application Priority Data
Sep. 24, 2012 (CN) .......................... 2012 1 0358325

(51) Int. Cl.
*H04L 5/00* (2006.01)
*H04W 24/10* (2009.01)
(Continued)

(52) U.S. Cl.
CPC .......... *H04L 5/0053* (2013.01); *H04L 5/0048* (2013.01); *H04W 24/10* (2013.01); *H04W 72/042* (2013.01); *H04W 88/08* (2013.01)

(58) Field of Classification Search
None
See application file for complete search history.

(56) References Cited

U.S. PATENT DOCUMENTS

2010/0303011 A1* 12/2010 Pan .................... H04L 5/001
370/328
2012/0163437 A1* 6/2012 Frederiksen .......... H04L 5/001
375/224

(Continued)

FOREIGN PATENT DOCUMENTS

| CN | 102215586 A | 10/2011 |
| CN | 102368871 A | 3/2012 |

(Continued)

OTHER PUBLICATIONS

3rd Generation Partnership Project; Technical Specification Group Radio Access Network; Evolved Universal Terrestrial Radio Access (E-UTRA); Physical layer procedures (Release 11)—Sep. 19, 2012.*

(Continued)

*Primary Examiner* — Hassan Kizou
*Assistant Examiner* — Hashim Bhatti
(74) *Attorney, Agent, or Firm* — Oppedahl Patent Law Firm LLC

(57) ABSTRACT

A method and device for detecting control signaling and a method and device for implementing control signaling detection are provided, wherein blind detection times or the amount of enhanced Physical Downlink Control Channels (ePDCCH) allocated by each ePDCCH resource set is (Continued)

determined, so that the ePDCCH needed to be detected in each ePDCCH resource set can be determined.

12 Claims, 4 Drawing Sheets

(51) Int. Cl.
    *H04W 72/04*     (2009.01)
    *H04W 88/08*     (2009.01)

(56) References Cited

U.S. PATENT DOCUMENTS

2013/0163551 A1* 6/2013 He .......................... H04W 4/06
                                                                        370/329
2014/0185508 A1* 7/2014 Suda ..................... H04W 48/16
                                                                        370/311
2015/0296542 A1* 10/2015 Heo .................. H04W 74/0833
                                                                        370/329

FOREIGN PATENT DOCUMENTS

| JP | 2014511056 A | 5/2014 |
|---|---|---|
| WO | 2012065533 A1 | 5/2012 |
| WO | 2012109542 A1 | 8/2012 |
| WO | 2012118269 A2 | 9/2012 |

OTHER PUBLICATIONS

International Search Report in international application No. PCT/CN2013/080854, mailed on Oct. 31, 2013.
English Translation of the Written Opinion of the International Search Authority in international application No. PCT/CN2013/080854, mailed on Oct. 31, 2013.
Supplementary European Search Report in European application No. 13839949.8, mailed on Oct. 21, 2015.
Physical Channels and Modulation, mailed on Sep. 2012.
Physical Layer procedures, mailed on Sep. 2012.
Search space design for ePDCCH, mailed on Aug. 2012.
PRB indlcation to UE for ePDCCH transmission, mailed on Aug. 2012.
Nokia, Nokia Siemens Networks, Considerations on search spaces for the E-PDCCH, 3GPP TSG RAN WG1 #68 Meeting R1-120734, mailed on Jan. 31, 2012.
ZTE, Discussion on ePDCCH candidates and search space design, 3GPP TSG RAN WG1 Meeting #70 R1-123374, mailed on Aug. 5, 2012.
ZTE, Discussion on ePDCCH resource set configuration, 3GPP TSG RAN WG1 Meeting #70bis R1-124200, mailed on Sep. 29, 2012.

* cited by examiner

METHODS AND DEVICES FOR DETECTING CONTROL SIGNALING AND IMPLEMENTING CONTROL SIGNALING DETECTION

TECHNICAL FIELD

The disclosure relates to the field of communications, and specifically relates to methods and devices for detecting control signaling and implementing control signaling detection.

BACKGROUND

In a Long Term Evolution (LTE) system and an Advanced Long Term Evolution (LTE-Advanced) system, downlink physical layer control signaling contains Downlink Grant (DL Grant) information needed to be acquired by a terminal (for example, a User Equipment (UE)) and related to downlink transmission, and Uplink Grant (UL Grant) information needed to be acquired by the terminal and related to uplink transmission, to indicate various information related to transmission such as a location of a transmission resource, a way for modulating a code and etc., and these pieces of physical layer control signaling are transmitted on a Physical Downlink Control channel (PDCCH). The physical layer control signaling is mainly referred to as customer specific control signaling of a physical layer.

In Release (R) 8/9 of the LTE system and R10 of the LTE-Advanced system, a physical layer control channel over which a physical layer control signaling is transmitted is generally configured in the first N Orthogonal Frequency Division Multiplexing (OFDM) symbols, and generally the N symbols are called a control signaling transmission area.

The available transmission resources in an existing control signaling transmission area (a first control signaling transmission area, a first control signaling area) is divided into multiple Control Channel Elements (CCE) which are taken as Resource Elements (REs), a resource occupied by the control signaling is allocated by taking a CCE as a unit, i.e. as an RE. The CCE may be further subdivided into a Resource Element Group (REG), one CCE is composed of multiple discontinuous REGs. Generally one CCE includes 9 REGs and each REG is composed of multiple basic REs.

Both specific and common control signaling are transmitted by taking a CCE as an RE, and then are mapped to corresponding REG resources, and then are mapped to Resource Elements (the minimum resource unit) of multiple Physical Resource Block (PRB) pairs (which are also called PRBs for short).

Blind detection is generally performed by a terminal in the following ways: computing initial locations of specific control signaling and common control signaling, wherein the specific control signaling is mainly concerned usually. An Aggregation Level (AL) of blind detection and blind detection times are shown in Table 1.

TABLE 1

| Blind detection space $S_k^{(L)}$ | | | |
|---|---|---|---|
| Type of control signaling | $AL^L$ | Size of blind detection space [in CCEs] | Times of blind detection $M^{(L)}$ |
| UE-specific | 1 | 6 | 6 (6/1) |
| | 2 | 12 | 6 (12/2) |
| | 4 | 8 | 2 (8/4) |
| | 8 | 16 | 2 (16/8) |
| Common | 4 | 16 | 4 (16/4) |
| | 8 | 16 | 2 (16/8) |

It can be seen from Table 1 that, a control signaling transmission resource allocated for a user is not continuous, which brings many difficulties to implementation of a closed loop precoding technique in an multi-antenna system, resulting in that only a diversity technique can be used and the closed loop precoding technique can hardly be used in the control signaling area.

In a release after R10, in order to improve a transmission capacity of a control channel and to make the control signaling to be capable of supporting more users, a new control channel area (a second control signaling transmission area, a second control signaling area) is developed, and the control signaling transmission resource of the same terminal may be a continuous time frequency resource, to support the closed loop precoding technique and improve a transmission performance of the control signaling.

The control signaling areas of new and old releases are shown in FIG. 1, a part of transmission resources may be allocated from a Physical Downlink Shared Channel (PDSCH) transmission area of an original R8/9/10 to act as a new control signaling transmission area, so that transmission of the control signaling supports the closed loop precoding technique, a capacity of the control signaling is increased, and control signalings of more users can be supported. A control channel transmitted in the second control signaling area may be called a second control channel or an enhanced PDCCH (ePDCCH).

A method for ePDCCH detection is introduced respectively in the following aspects such as, resource granularity detection, a location for ePDCCH transmission (an ePDCCH candidate), a pilot frequency port, a transmission way, and etc.

In general, a base station may first notify a terminal of an ePDCCH resource set. The base station and the terminal may also predefine a basic resource allocation element, and then predefine a size of several occupied resources (which is generally aggregation of one or more resource allocation elements), and the aggregation of N resource allocation elements is called AL N. Generally a basic resource element, namely an enhanced Control Channel Element (eCCE) is defined, and a function of the eCCE is the same as that of the CCE. In a second control area, the eCCE may borrow a definition of the CCE or slightly modify the definition, or may also make a new definition. The size of the eCCE may be constant or variable. The eCCE may contain a Distributed eCCE (D-eCCE) and a Localized eCCE (L-eCCE) as shown in FIG. 2 and FIG. 3.

The control signaling may define different ALs based on the eCCE, for example a Localized-type AL set is {1, 2, 4, 8} or {1, 2, 4, 8, 16}, and then different ALs denote different sizes of resources. A Distributed-type AL set is {1, 2, 4, 8, 16} or {1, 2, 4, 8, 16, 32}, and thus the terminal can perform blind detection directionally on corresponding ALs.

Currently, a total set of ALs available for detection may be determined according to some specific cases, as shown in Table 2 or Table 3.

TABLE 2

| | $N_{ECCE}$ | | |
|---|---|---|---|
| Normal subframes and special subframes, configuration 3, 4, 8, with $n_{EPDCCH} <$ 104 and using normal cyclic perfix | | All other cases | |
| Localized transmission | Distributed transmission | Localized transmission | Distributed transmission |
| 2 | 2 | 1 | 1 |
| 4 | 4 | 2 | 2 |
| 8 | 8 | 4 | 4 |
| — | 16 | — | 8 |

TABLE 3

| | $N_{ECCE}$ | | |
|---|---|---|---|
| Normal subframes and special subframes, configuration 3, 4, 8, with $n_{EPDCCH} <$ 104 and using normal cyclic perfix | | All other cases | |
| Localized transmission | Distributed transmission | Localized transmission | Distributed transmission |
| 2 | 2 | 1 | 1 |
| 4 | 4 | 2 | 2 |
| 8 | 8 | 4 | 4 |
| 16 | 16 | 8 | 8 |
| — | 32 | — | 16 |

A base station may configure multiple ePDCCH resource sets for the terminal, each ePDCCH resource set may uniquely corresponds to a type such as a Localizetype D (which is called a type L for short) or a Distributetype D (which is called a type D for short). The type of the ePDCCH resource set and an ePDCCH transmission type are the same, the type of the ePDCCH resource set and the ePDCCH transmission type may be Localized or Distributed. The type is referred to that if the type of the ePDCCH resource set is set as a distributetype D, then only Distributed ePDCCHs are transmitted or detected in the ePDCCH resource set; if the type of the ePDCCH resource set is set as a localizetype D, then only Localized ePDCCHs are transmitted or detected in the ePDCCH resource set.

In general, when a Distributed ePDCCH is detected in the Distributed-type ePDCCH resource set, detection may be performed in accordance with the aggregation of L-eCCEs. When a Localized ePDCCH is detected in the Localized-type ePDCCH resource set, the detection may be generally performed in accordance with the aggregation of Localized eCCEs.

Since a terminal is limited due to complexity, there is always a certain limitation to a total number of times of blind detection, and there is just a little difference between the number of times of blind detection in a case of less ePDCCH resource sets configured and that in a case of more ePDCCH resource sets configured. Therefore, a technical problem to be solved is how to determine the number of times of blind detection or the amount of the ePDCCHs allocated by each ePDCCH resource set to further determine ePDCCHs needed to be detected in each ePDCCH resource set.

SUMMARY

In view of this, the embodiments of the disclosure provide methods and devices for detecting control signaling and implementing control signaling detection, to determine blind detection times or the amount of ePDCCHs allocated by each ePDCCH resource set, thus determining ePDCCHs needed to be detected in each ePDCCH resource set.

In order to achieve the above purpose, a technical scheme of an embodiment of the disclosure is implemented in the following way.

A method for detecting control signaling, which may include:

detecting, by a terminal, control signaling in K enhanced Physical Downlink Control channel (ePDCCH) resource sets in a subframe S; wherein the amount of ePDCCHs detected by the terminal in Set i of the K ePDCCH resource sets is X(i), i is an integer, and 0<I<=K, at least one X(i) is determined according to a first type of parameter, and the first type of parameter at least includes a value of K or the value of K and an index i of the K ePDCCH resource sets.

The first type of parameter at least may include the value of K, the index i, and a value of N of the K ePDCCH resource sets; or the first type of parameter at least may include the value of K, the index i, and a value of N of Set i; or the first type of parameter at least may include the value of K, the index i, and a configuration of a D/L type of the K ePDCCH resource sets; or the first type of parameter at least may include the value of K, the index i, and a configuration of a D/L type of Set i; or the first type of parameter at least may include the value of K, the index i, a D/L type corresponding to the K ePDCCH resource sets, and a value of N of the K ePDCCH resource sets.

The first type of parameter may further include blind detection times allocation signaling or the amount of high layer ePDCCH candidates; or the first type of parameter may further include the amount of enhanced Resource Element Groups (eREG) contained in an enhanced Control Channel Element (eCCE) in the subframe S; or the first type of parameter may further include an Aggregation Level (AL) needed to be detected in the Set i, or the AL needed to be detected in the K ePDCCH resource sets.

The first type of parameter may further include a subframe type and/or one of the following three parameters: an encoding rate corresponding to a Downlink Control Information Format (DCI Format) in the subframe S, the amount of REs which are capable of transmitting the ePDCCHs in a PRB pair in the subframe S, and the amount of REs which are capable of transmitting the ePDCCHs in the eCCE in the subframe S.

The subframe type at least may include one of the followings: various types of Time Division Duplex (TDD) special subframes of a Network Control Protocol (NCP), various types of TDD special subframes of an Encryption Control Protocol (ECP), a normal subframe of the NCP, and a normal subframe of the ECP.

A method for detecting control signaling, which may include:

detecting, by a terminal, control signaling in K enhanced Physical Downlink Control channel (ePDCCH) resource sets in a subframe S; wherein the amount of ePDCCHs detected by the terminal in Set i of the K ePDCCH resource sets is X(i), i is an integer, and 0<i<=K, at least one X(i) is determined according to a first type of parameter, and the first type of parameter at least includes AL sets detected in Set i or a detected AL set separately corresponding to the K ePDCCH resource sets.

The first type of parameter at lease may further include a D/L type of Set i; or the first type of parameter at lease may further include a D/L type of the K ePDCCH resource sets; or the first type of parameter at lease may further include a value of N of Set i; or the first type of parameter at lease may further include a value of N of the K ePDCCH resource sets; or the first type of parameter at lease may further include a value of N and a D/L type of the ePDCCH resource set of Set i; or the first type of parameter at lease may further include a value of N of the K ePDCCH resource sets, and a D/L type of the K ePDCCH resource sets; or the first type of parameter at lease may further include blind detection times allocation signaling or the amount of high layer ePDCCH candidates; or the first type of parameter at lease may further include the around of eREGs contained in an eCCE in the subframe S.

The first type of parameter may further include a subframe type and/or one of the following three parameters: an encoding rate corresponding to a DCI Format in the subframe S, the amount of REs which are capable of transmitting the ePDCCHs in a PRB pair in the subframe S, and the amount of REs which are capable of transmitting the ePDCCHs in the eCCE in the subframe S.

The subframe type at least may include one of the followings: various types of TDD special subframes of a NCP, various types of TDD special subframes of an ECP, a normal subframe of the NCP, and a normal subframe of the ECP.

The K ePDCCH resource sets have a constant amount of ePDCCHs at any designated AL, and K is any integer which is not larger than 6.

A method for detecting control signalling is provided, which may include:

detecting, by a terminal, control signaling in K enhanced Physical Downlink Control channel (ePDCCH) resource sets in a subframe S; wherein the amount of ePDCCHs detected by the terminal in Set i of the K ePDCCH resource sets is X(i), i is an integer, and 0<i<=K, at least one X(i) is determined according to a first type of parameter, and the first type of parameter at least includes blind detection times allocation signaling of a high layer.

The first type of parameter at least may further include a subframe type and/or one of the following three parameters: an encoding rate corresponding to a DCI Format in the subframe S, the amount of REs which are capable of transmitting the ePDCCHs in a PRB pair in the subframe S, and the amount of REs which are capable of transmitting the ePDCCHs in an eCCE in the subframe S.

The first type parameter at least may further include the amount of eREGs contained in the eCCE in the subframe S.

The subframe type at least may include one of the followings: various types of TDD special subframes of a NCP, various types of TDD special subframes of an ECP, a normal subframe of the NCP, and a normal subframe of the ECP.

A method for detecting control signalling is provided, which may include:

detecting, by a terminal, control signaling in K enhanced Physical Downlink Control channel (ePDCCH) resource sets in a subframe S; wherein the amount of ePDCCHs detected by the terminal in Set i of the K ePDCCH resource sets is X(i), i is an integer, and 0<i<=K, at least one X(i) is determined according to a first type of parameter, and the first type of parameter at least includes the amount of eREGs contained in an eCCE in the subframe S.

A device for detecting control signalling is provided, which may be configured to detect control signaling in K enhanced Physical Downlink Control channel (ePDCCH) resource sets in a subframe S; wherein the amount of ePDCCHs detected in Set i of the K ePDCCH resource sets is X(i), i is an integer, and 0<I<=K, at least one X(i) is determined according to a first type of parameter, and the first type of parameter at least includes a value of K or the value of K and an index i of the K ePDCCH resource sets.

The first type of parameter at least may include the value of K, the index i, and a value of N of the K ePDCCH resource sets; or the first type of parameter at least may include the value of K, the index i, and a value of N of the Set i; or the first type of parameter at least may include the value of K, the index i, and a configuration of a D/L type of the K ePDCCH resource sets; or the first type of parameter at least may include the value of K, the index i, and a configuration of a D/L type of the Set i; or the first type of parameter at least may include the value of K, the index i, a D/L type corresponding to the K ePDCCH resource sets, and a value of N of the K ePDCCH resource sets.

The first type of parameter may further include blind detection times allocation signaling or the amount of high layer ePDCCH candidates; or the first type of parameter may further include the amount of eREGs contained in an eCCE in the subframe S; or the first type of parameter may further include an AL needed to be detected in the Set i, or the AL needed to be detected in the K ePDCCH resource sets.

The first type of parameter may further include a subframe type and/or one of the following three parameters: an encoding rate corresponding to a DCI Format in the subframe S, the amount of REs which are capable of transmitting the ePDCCHs in a PRB pair in the subframe S, and the amount of REs which are capable of transmitting the ePDCCHs in the eCCE in the subframe S.

The subframe type at least may include one of the followings: various types of TDD special subframes of a NCP, various types of TDD special subframes of an ECP, a normal subframe of the NCP, and a normal subframe of the ECP.

The device may be a terminal.

A device for detecting control signalling is provided, which may be configured to detect control signaling in K enhanced Physical Downlink Control channel (ePDCCH) resource sets in a subframe S; wherein the amount of ePDCCHs detected in Set i of the K ePDCCH resource sets is X(i), i is an integer, and 0<i<=K, at least one X(i) is determined according to a first type of parameter, and the first type of parameter at least includes an AL set detected in the Set i or detected AL sets separately corresponding to the K ePDCCH resource sets.

The first type of parameter at lease may further include a D/L type of the Set i; or the first type of parameter at lease may further include a D/L type of the K ePDCCH resource sets; or the first type of parameter at lease may further include a value of N of Set i; or the first type of parameter at lease may further include a value of N of the K ePDCCH resource sets; or the first type of parameter at lease may further include a value of N and a D/L type of the ePDCCH resource set of Set i; or the first type of parameter at lease may further include a value of N of the K ePDCCH resource sets and a D/L type of the K ePDCCH resource sets; or the first type of parameter at lease may further include blind detection times allocation signaling or the amount of high layer ePDCCH candidates; or the first type of parameter at lease may further include the around of eREGs contained in an eCCE in the subframe S.

The first type of parameter may further include a subframe type and/or one of the following three parameters: an encoding rate corresponding to a DCI Format in the subframe S, the amount of REs which are capable of transmitting the ePDCCHs in a PRB pair in the subframe S, and the amount of REs which are capable of transmitting the ePDCCHs in the eCCE in the subframe S.

The subframe type at least may include one of the followings: various types of TDD special subframes of a NCP, various types of TDD special subframes of an ECP, a normal subframe of the NCP, and a normal subframe of the ECP.

The K ePDCCH resource sets have a constant amount of ePDCCHs at any designated AL, and K may be any integer which is not larger than 6.

The device may be a terminal.

A device for detecting control signalling is provided, which may be configured to detect control signaling in K enhanced Physical Downlink Control channel (ePDCCH) resource sets in a subframe S; wherein the amount of ePDCCHs detected in Set i of the K ePDCCH resource sets is X(i), i is an integer, and 0<i<=K, at least one X(i) is determined according to a first type of parameter, and the first type of parameter at least includes blind detection times allocation signaling of a high layer.

The first type of parameter at least may further include a subframe type and/or one of the following three parameters: an encoding rate corresponding to a DCI Format in the subframe S, the amount of REs which are capable of transmitting the ePDCCHs in a PRB pair in the subframe S, and the amount of REs which are capable of transmitting the ePDCCHs in the eCCE of the subframe S.

The first type parameter at least may further include the amount of eREGs contained in an eCCE in the subframe S.

The subframe type at least may include one of the followings: various types of TDD special subframes of a NCP, various types of TDD special subframes of an ECP, a normal subframe of the NCP, and a normal subframe of the ECP.

The device may be a terminal.

A device for detecting control signalling is provided, which may be configured to detect control signaling in K enhanced Physical Downlink Control channel (ePDCCH) resource sets in a subframe S; wherein the amount of ePDCCHs detected in Set i of the K ePDCCH resource sets is X(i), i is an integer, and 0<i<=K, at least one X(i) is determined according to a first type of parameter, and the first type of parameter at least includes the amount of eREGs contained in an eCCE.

The device may be a terminal.

A method for implementing control signaling detection is provided, which may include:

notifying through signaling, by a base station, the amount of candidates needed to be detected by each ePDCCH resource set Set i or blind detection times.

The base station may jointly encode information of K, Set index information, and the amount of candidates needed to be detected, and performs notification; or the base station may jointly encode information of K, a value of N of K ePDCCH resource sets, and the amount of candidates needed to be detected, and performs notification; or the base station may jointly encode information of K, a value of N of Set i, and performs notification; or the base station may jointly encode information of K, a D/L type of the K ePDCCH resource sets, and the amount of candidates needed to be detected, and performs notification; or the base station may jointly encode information of K, a D/L type of the K ePDCCH resource sets, a value of N, and the amount of candidates needed to be detected, and performs notification; or the base station may jointly encode information of K, and the amount of candidates needed to be detected by the K ePDCCH resource sets, and performs notification; or the base station may jointly encode AL level information needed to be detected in set, and the amount of candidates needed to be detected, and performs notification; or the base station may jointly encode AL level information needed to be detected by K Sets, and the amount of candidates needed to be detected by the K Sets, and performs notification; or the base station may jointly encode AL level information needed to be detected by the K Sets, the amount of candidates needed to be detected by the K Sets, and a D/L type of the K Sets, and performs notification; or the base station may jointly encode the amount of candidates needed to be detected in set i, and a D/L type of Set i, and performs notification; or the base station may jointly encode AL level information needed to be detected by the K Sets, the amount of candidates needed to be detected by the K Sets, a D/L type of the K Sets, and a value of N of the K Sets, and performs notification; or the base station may jointly encode the amount of candidates needed to be detected in set i, a D/L type of Set i, and a value of N, and performs notification.

The method may further include that the base station notifies corresponding blind detection times allocation information separately according to the amount of eREGs contained in different eCCEs.

A device for implementing control signaling detection is provided, which may be configured to notify through signaling the amount of candidates needed to be detected by each ePDCCH resource set Set i and blind detection times.

The device may be configured to:

jointly encode information of K, Set index information, and the amount of candidates needed to be detected, and perform notification; or jointly encode information of K, a value of N of K ePDCCH resource sets, and the amount of candidates needed to be detected, and perform notification; or jointly encode information of K, a value of N of Set i, and perform notification; or jointly encode information of K, a D/L type of the K ePDCCH resource sets, and the amount of candidates needed to be detected, and perform notification; or jointly encode information of K, a D/L type of the K ePDCCH resource sets, a value of N, and the amount of candidates needed to be detected, and perform notification; or jointly encode information of K, and the amount of candidates needed to be detected by the K ePDCCH resource sets, and perform notification; or jointly encode AL level information needed to be detected in set, and the amount of candidates needed to be detected, and perform notification; or jointly encode AL level information needed to be detected by K Sets, and the amount of candidates needed to be detected by the K Sets, and perform notification; or jointly encode AL level information needed to be detected by the K Sets, the amount of candidates needed to be detected by the K Sets, and a D/L type of the K Sets, and perform notification; or jointly encode the amount of candidates needed to be detected in set i, and a D/L type of Set i, and perform notification; or jointly encode AL level information needed to be detected by the K Sets, the amount of candidates needed to be detected by the K Sets, a D/L type of the K Sets, and a value of N of the K Sets, and perform notification; or jointly encode the amount of candidates needed to be detected in set i, a D/L type of Set i, and a value of N, and perform notification.

The device may be further configured to notify corresponding blind detection times allocation information separately according to the amount of eREGs contained in different eCCEs.

The device may be a base station.

The technique for detecting control signaling and implementing control signaling detection in the embodiments of the disclosure can determine blind detection times or the amount of ePDCCHs allocated by each ePDCCH resource set, and thereby can determine the ePDCCHs needed to be detected in each ePDCCH resource set.

DETAILED DESCRIPTION

Figures 5, 6:
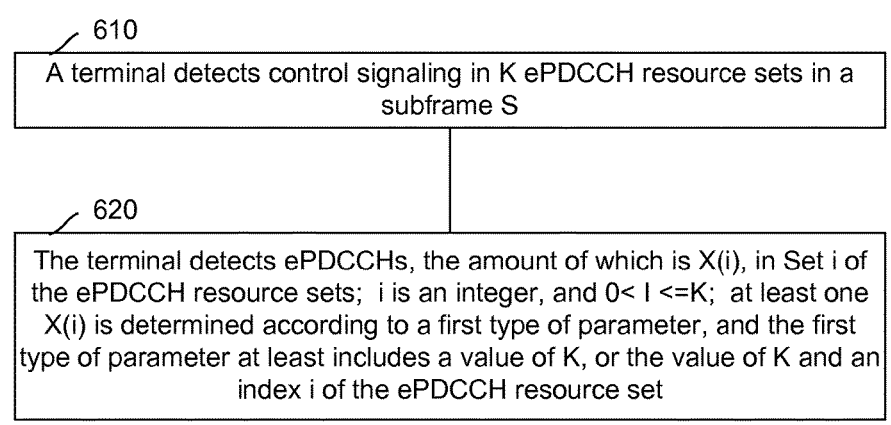
FIG. 5 is a schematic view of a principle of control signalling detection of another embodiment of the disclosure.
FIG. 6 is a flowchart of control signalling detection in an embodiment of the disclosure.

In an actual application, there may be many ways to implement detection of control signaling, for example:

Way 1: in a subframe S, a terminal detects control signaling in K ePDCCH resource sets configured by a base station for the terminal; the terminal detects ePDCCHs, the amount of which is X(i), in a set i (Set i) of the ePDCCH resource sets (namely the amount of the ePDCCHs detected in Set i by the terminal is X(i)); i is an integer, and 0<i<=K; at least one X(i) is determined according to a first type of parameter, and the first type of parameter at least includes a value of K, or the value of K and an index i of the ePDCCH resource set, as shown in FIG. 6.

It shall be explained that all Sets mentioned below represent ePDCCH resource sets.

The first type of parameter may only include the value of K, or the value of K and the index i;

further, the first type of parameter may at least include the value of K, the index i, and a value of N (N1 to Nk) of the K ePDCCH resource sets;

further, the first type of parameter may at least include the value of K, the index i, and the value of N of Set i;

further, the first type of parameter may at least include the value of K, the index i, and a configuration of a D/L type of the K ePDCCH resource sets;

further, the first type of parameter may at least include the value of K, the index i, and a configuration of a D/L type of Set i;

further, the first type of parameter may at least include the value of K, the index i, the D/L type corresponding to the K ePDCCH resource sets, and the value of N of the K ePDCCH resource sets;

further, the first type of parameter may further include blind detection times allocation signaling or the amount of high layer ePDCCH candidates;

further, the first type of parameter may further include the amount of eREGs contained in an eCCE in the subframe S;

further, the first type of parameter may further include an AL needed to be detected in Set i, or the ALs needed to be detected in the K ePDCCH resource sets;

the first type of parameter may further include a subframe type and/or one of the following three parameters: an encoding rate corresponding to a DCI Format in the subframe S, the amount of REs which can be used to transmit the ePDCCH in a PRB pair of the subframe S, and the amount of REs which can be used to transmit the ePDCCH in the eCCE in the subframe S.

The type of the subframe at least includes one of the followings: various types of TDD special subframes of an NCP, various types of TDD special subframes of an ECP, a normal subframe of the NCP, and a normal subframe of the ECP.

Way 2 is that in a subframe S, a terminal detects control signaling in K ePDCCH resource sets configured by a base station for the terminal; the amount of ePDCCHs detected in Set i by the terminal is X(i), i is an integer, and 0<i<=K; at least one X(i) is determined according to a first type of parameter, and the first type of parameter at least includes an AL set detected in Set i, or detected AL sets AL(1)-AL(k) separately corresponding to the K ePDCCH resource sets.

In Way 2, X(i) may be determined only according to the AL set detected in Set i, or the detected AL sets AL(1)-AL(k) separately corresponding to the K ePDCCH resource sets;

further, the first type of parameter may at least further include a D/L type of Set i;

further, the first type of parameter may at least further the D/L type of the K ePDCCH resource sets;

further, the first type of parameter may at least further include a value of N of Set i;

further, the first type of parameter may at least further include the value of N of the K ePDCCH resource sets;

further, the first type of parameter may at least further include the value of N and the D/L type of the ePDCCH resource set of Set i;

further, the first type of parameter may at least further include the value of N from N1 to Nk of the K ePDCCH resource sets, and the D/L type of the K ePDCCH resource sets;

further, the first type of parameter may at least further include blind detection times allocation signaling or the amount of high layer ePDCCH candidates;

further, the first type of parameter may at least further include the amount of eREGs contained in an eCCE in the subframe S;

the first type of parameter may at least further include a subframe type and/or one of the following three parameters: an encoding rate corresponding to a DCI Format in the subframe S, the amount of REs which can be used to transmit the ePDCCH in a PRB pair in the subframe S, and the amount of the REs which can be used to transmit the ePDCCH in the eCCE in the subframe S.

The type of the subframe at least includes one of the followings: various types of TDD special subframes of an NCP, various types of TDD special subframes of an ECP, a normal subframe of the NCP, and a normal subframe of the ECP.

When any designated AL, a total amount of the ePDCCHs of the K ePDCCH resource sets at this AL is constant, and K is any integer which is not larger than 6.

Way 3 is that in a subframe S, a terminal detects control signaling in K ePDCCH resource sets configured by a base station for the terminal; the amount of ePDCCHs detected in Set i by the terminal is $X(i)$, i is an integer, and $0<i<=K$; i is an integer, and $0<i<=K$; at least one $X(i)$ is determined according to a first type of parameter, and the first type of parameter at least includes blind detection times allocation signaling of a high layer.

The first type of parameter may at least further include a subframe type and/or one of the following three parameters: an encoding rate corresponding to a DCI Format in the subframe S, the amount of REs which can be used to transmit the ePDCCHs in a PRB pair in the subframe S, and the amount of REs which can be used to transmit the ePDCCHs in the eCCE in the subframe S.

The type of the subframe at least includes one of the followings: various types of TDD special subframes of an NCP, various types of TDD special subframes of an ECP, a normal subframe of the NCP, and a normal subframe of the ECP.

Further, the first type parameter may at least further include the amount of eREGs contained in an eCCE in the subframe S.

Way 4 is that in a subframe S, a terminal detects control signaling in K ePDCCH resource sets configured by a base station for the terminal; the amount of ePDCCHs detected in Set i by the terminal is $X(i)$, i is an integer, and $0<i<=K$; i is an integer, and $0<i<=K$; at least one $X(i)$ is determined according to a first type of parameter, and the first type of parameter at least includes the amount of eREGs contained in an eCCE in the subframe S.

Embodiment 1

The First Type of Parameter Only Includes K or K and the Index i

In the subframe S, a base station configures K ePDCCH resource sets for a terminal, and the terminal can uniquely determine the amount of the ePDCCHs needed to be blindly detected according the value of K and the serial numbers of the ePDCCH resource sets, as shown in the following table:

TABLE 4

|  | Set 1 | Set 2 |
|---|---|---|
| K = 1 | 16 | — |
| K = 2 | 8 | 8 |

Figure 1:
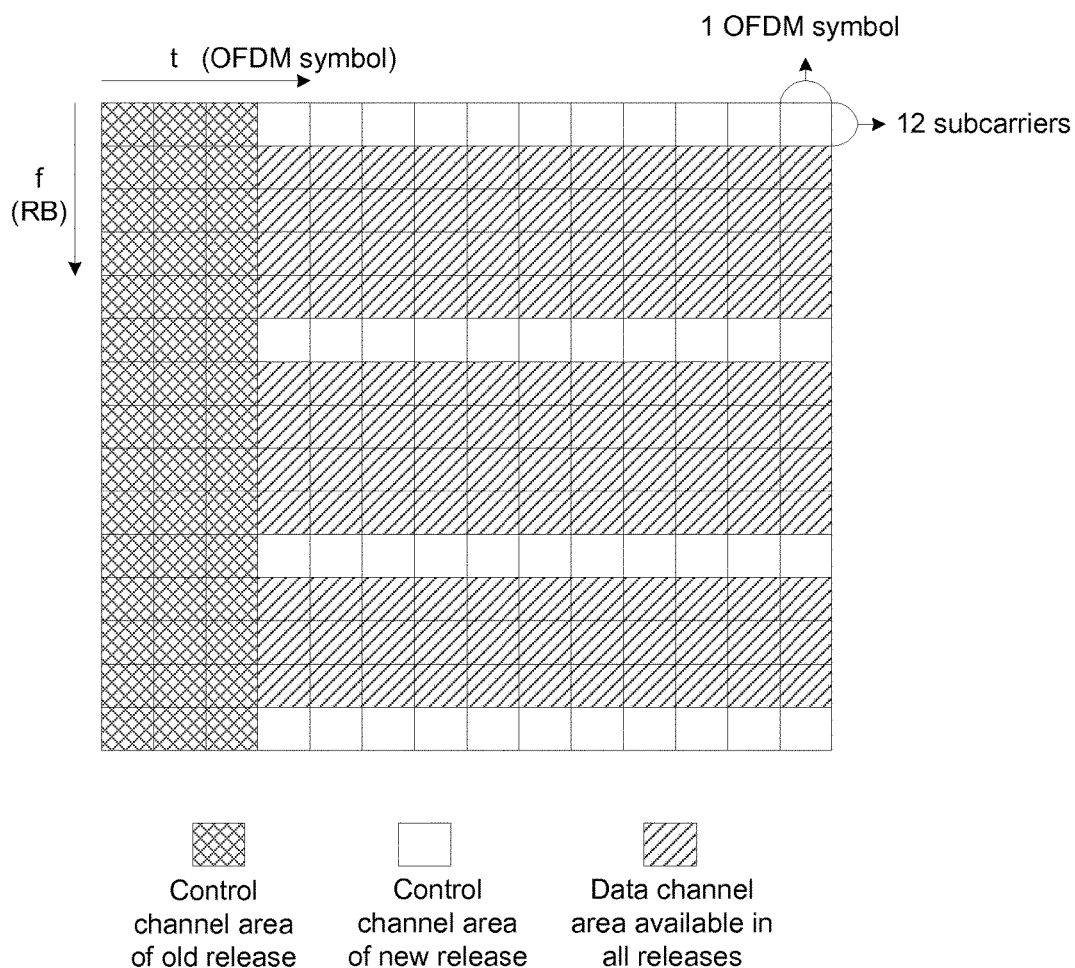
FIG. 1 is a view of control signaling areas of new and old releases.
Figure 2:
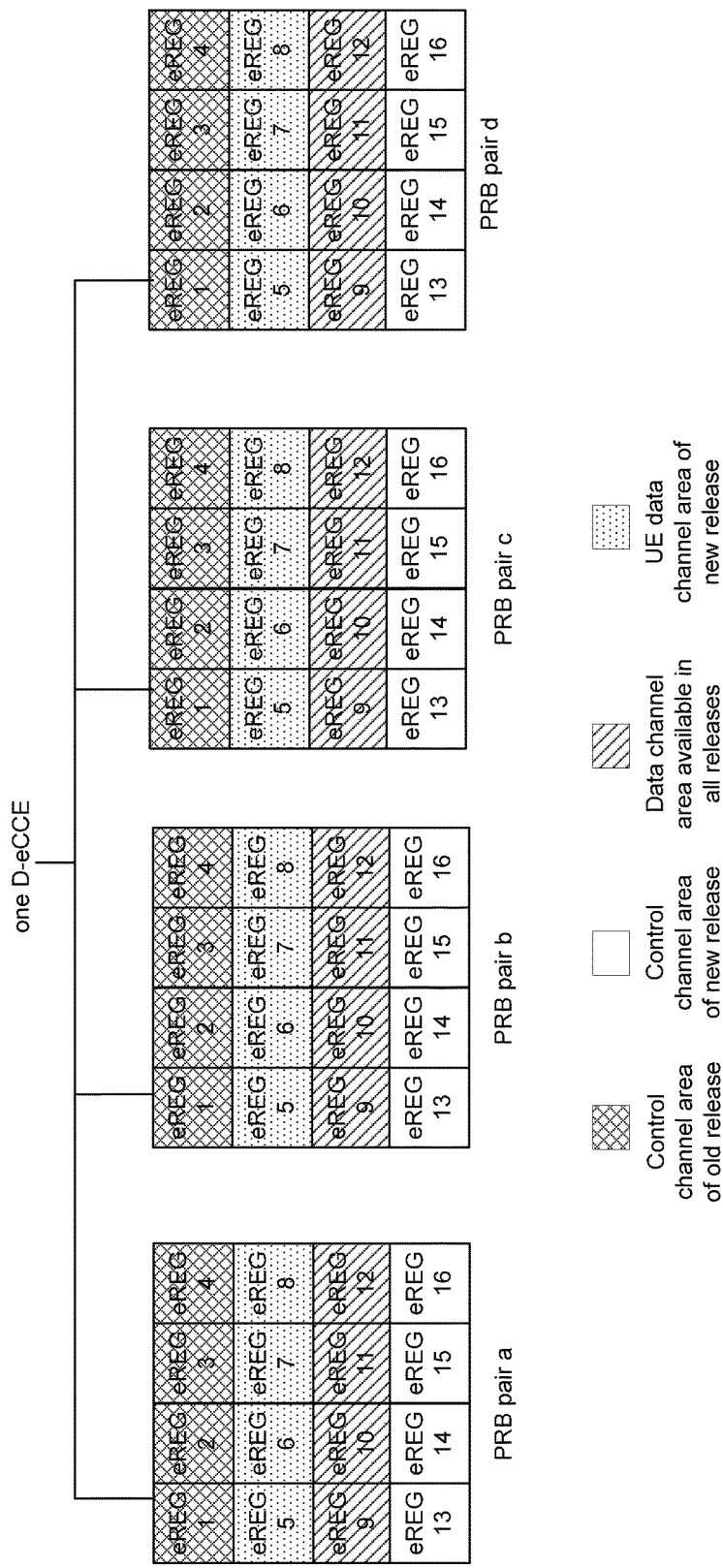
FIG. 2 is a structure view of D-eCCE.
Figure 3:
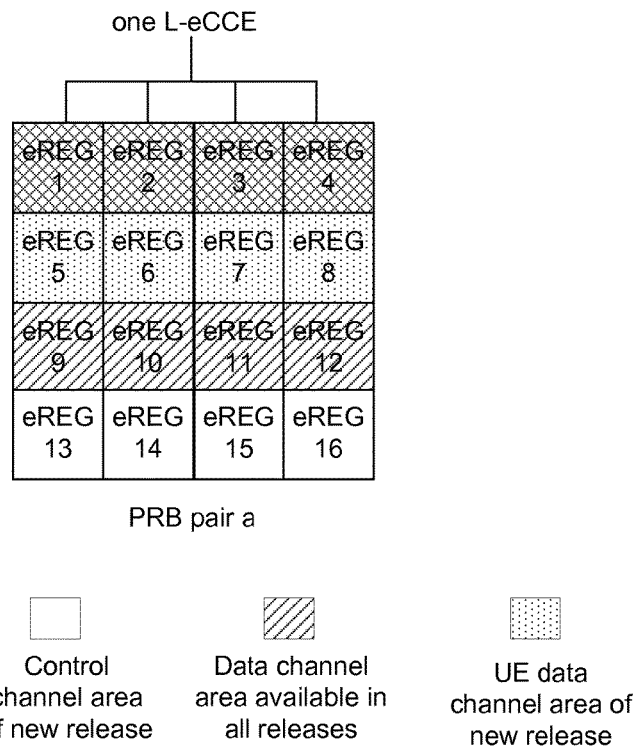
FIG. 3 is a structure view of L-eCCE.
Figure 4:
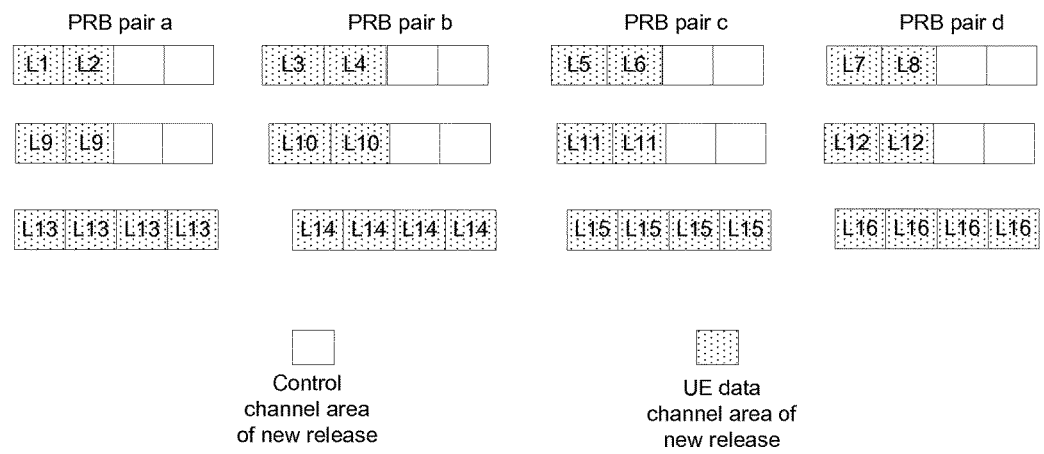
FIG. 4 is a schematic view of a principle of control signalling detection of an embodiment of the disclosure.

After determining the amount of the ePDCCHs needed to be blindly detected, the terminal determines the mapping of a specific ePDCCH needed to be detected according to the types of the ePDCCH resource sets, ALs needed to be detected by the ePDCCH resource sets, and other parameter, for example, a Localized-type ePDCCH resource set may select 16 ePDCCHs for detection, as shown in FIG. 4;

a Distributed-type ePDCCH resource set may select 16 ePDCCHs for detection, as shown in FIG. 5.

When a case in which K=1, a UE can determine that the amount of the ePDCCHs needed to be blindly detected is 16 according to the value of K. If the type of this ePDCCH resource set is L, then it can be determined that the ePDCCHs needed to be detected are L1 to L16; if the type of this ePDCCH resource set is D, it can be determined that the ePDCCHs needed to be detected are D1 to D16.

When a case in which K=2, the UE can determine that the amount of the ePDCCHs needed to be blindly detected by each one of 2 ePDCCH resource sets is 8 according to the value of K. If the type of this ePDCCH resource set is L, then it can be determined that there are 8 ePDCCHs needed to be detected in L1 to L16, wherein the specific 8 ePDCCHs may be determined according to a rule predefined by the base station and the terminal, for example L1 to L8, or L1, L3, L7, . . . L15, and the 8 ePDCCHs may also be determined by the terminal in combination with the ALs needed to be determined and according to configuration signaling of the base station. In an actual application, the method may be not limited to the method mentioned here. If the type of this ePDCCH resource set is D, the 8 ePDCCHs needed to be determined may also be determined from D1 to D16 in accordance with a similar method.

Besides the above rule, other predetermined rule may also be adopted, for example:

TABLE 5

|  | Set 1 | Set 2 |
|---|---|---|
| K = 1 | 16 | — |
| K = 2 | 12 | 4 | or

TABLE 6

|  | Set 1 | Set 2 |
|---|---|---|
| K = 1 | 16 | — |
| K = 2 | 10 | 6 |

Besides the case in which a maximum value of K is 2, there are other cases in which the maximum value is not limited to 2, for example, the terminal may uniquely determine the amount of the blindly detected ePDCCHs according to the value of K, serial numbers of the ePDCCH resource sets, and the rule defined in the following table:

TABLE 7

|  | Set 1 | Set 2 | Set 3 | Set 4 |
|---|---|---|---|---|
| K = 1 | 16 | — | — | — |
| K = 2 | 8 | 8 | — | — |
| K = 3 | 8 | 4 | 4 | — |
| K = 4 | 4 | 4 | 4 | 4 | or

TABLE 8

|       | Set 1 | Set 2 | Set 3 | Set 4 |
|-------|-------|-------|-------|-------|
| K = 1 | 16    | —     | —     | —     |
| K = 2 | 8     | 8     | —     | —     |
| K = 3 | 6     | 6     | 4     | —     |
| K = 4 | 6     | 6     | 2     | 2     |

After the amount of the blindly detected ePDCCHs corresponding to Set i is determined according to the value of K or the value of K and the index i and the predetermined rule, the terminal may then determine the specific ePDCCHs needed to be detected in a similar ways as above, and then perform blind detection.

There is an implementation way equivalent to the above method, that is, the base station jointly encodes information of K, index information of Set, and the amount of the candidates needed to be detected, and performs notification.

While obtaining the information of K, the base station also obtains information of the amount of the candidates needed to be detected. A specific jointly encoding table may refer to the above table.

For example, in the way described above, in the case in which the maximum value of K is 2, 1 bit may be used for representation, in which 0 represents K=1, and 1 represents K=2; the terminal further determines the information of the candidates needed to be detected by each Set according to the information of K and the rule in Table 4.

An equivalent way is:

1 bit signaling represents the information of K and the information of the candidates needed to be detected by each Set;

0 represents that K=1 and Set 1 detects 16 candidates;

1 represents that K=2, Set 1 detects 8 candidates, and Set 2 represents 8 candidates.

Embodiment 2

The First Type of Parameter at Least Includes the Value of K, the Index i, and the Value of N (N1 to Nk) of K ePDCCH Resource Sets In the subframe S, the base station configures K ePDCCH resource sets for the terminal, the terminal may determine the amount of the ePDCCHs needed to be blindly detected according to the value of K, the index i, and the value of N (N1 to Nk) of the K ePDCCH resource sets, as shown in the following table, which corresponds to a case in which a maximum value of K is 2:

TABLE 9

|       | Set 1 | Set 2 |
|-------|-------|-------|
| K = 1 | 16    | —     |
| K = 2 | floor((N1*16)/(N1 + N2)) | 16-floor((N1*16)/(N1 + N2)) |

Or as shown in the following table, this table also corresponds to the case in which the maximum value of K is 2:

TABLE 10

|       | Set 1 | Set 2 |
|-------|-------|-------|
| K = 1 | 16    | —     |
| K = 2 | floor((N1*16)/(a*N1 + b*N2)) | 16-floor((N1*16)/(a*N1 + b*N2)) |

Here, floor means rounding down, a and b are predetermined weight coefficients which may be set as any real number larger than 0, N1 and N2 separately represent the amount of PRB pairs contained in Set 1 and Set 2.

Or as shown in the following table, this table corresponds to a case in which the maximum value of K is 3:

TABLE 11

|       | Set 1 | Set 2 | Set 3 | Set 4 |
|-------|-------|-------|-------|-------|
| K = 1 | 16    | —     | —     | —     |
| K = 2 | 8     | 8     | —     | —     |
| K = 3 | floor((N1*16)/(N1 + N2 + N3)) | floor((N2*16)/(N1 + N2 + N3)) | 16-floor((N1*16)/(N1 + N2 + N3)) - floor((N2*16)/(N1 + N2 + N3)) | — |

Or as shown in the following table, this table corresponds to the case in which the maximum value of K is 3:

TABLE 12

|       | Set 1 | Set 2 | Set 3 | Set 4 |
|-------|-------|-------|-------|-------|
| K = 1 | 16    | —     | —     | —     |
| K = 2 | 8     | 8     | —     | —     |
| K = 3 | floor((a*N1*16)/(a*N1 + b*N2 + c*N3)) | floor((b*N2*16)/(a*N1 + b*N2 + c*N3)) | 16-floor((a*N1*16)/(a*N1 + b*N2 + c*N3)) - floor((b*N2*16)/(a*N1 + b*N2 + c*N3)) | — |

Here, floor means rounding down, a, b and c are predetermined weight coefficients which may be set as any real number larger than 0. N1, N 2 and N3 separately represent the amount of PRB pairs contained in Set 1, Set 2 and Set 3.

After the amount of blindly detected ePDCCHs corresponding to Set i is determined, similar to the above, the specific ePDCCHs needed to be detected may then be determined, and then the blind detection is performed.

There is an implementation way equivalent to the above method, that is, the base station jointly encodes the information of K, the value of N (N1 to Nk) of the K ePDCCH resource sets, and the amount of the candidates needed to be detected, and performs notification.

Embodiment 3

The First Type of Parameter at Least Includes the Value of K, the Index i, and the Value of N of Set i In the subframe S, the base station configures K ePDCCH resource sets for the terminal, the terminal may determine the amount of ePDCCHs needed to be blindly detected according to the value of K, the index i, and the value of N corresponding to Set i, as shown in the following table, which corresponds to a case in which the maximum value of K is 2:

TABLE 13

|  | Set 1 | Set 2 |
| --- | --- | --- |
| K = 1 | 16 | — |
| K = 2 | 16*N1/8 | 16*N2/8 |

Here, when K=2, N1 and N2 may be limited to be set as 2 or 4.
Or that is:

TABLE 14

|  | Set 1 | Set 2 |
| --- | --- | --- |
| K = 1 | 16 | — |
| K = 2 | N1 | N2 |

After the amount of the blindly detected ePDCCHs corresponding to Set i is determined, similar to the above, the specific ePDCCHs needed to be detected may then be determined, and then the blind detection is performed.

There is an implementation way equivalent to the above method, that is, the base station jointly encodes the information of K, and information of the value N of Set i, and performs notification.

Embodiment 4

The First Type of Perimeter at Least Includes the Value of K, the Index i, and Configuration of the D/L Type of K ePDCCH Resource Sets In the subframe S, the base station configures K ePDCCH resource sets for the terminal, the terminal may determine the amount of the ePDCCHs needed to be blindly detected according to the value of K, the index i, and the configuration of the D/L type of the K ePDCCH resource sets, as shown in the following table, which corresponds to the case in which the maximum value of K is 2.

Here, the type (D/L) of the ePDCCH resource sets may be determined by a configuration by the base station;

TABLE 15

|  | Set 1 | Set 2 |
| --- | --- | --- |
| K = 1 | 16 | — |
| K = 2(Set 1, Two Sets are 1D/1L) | 8 | 8 |
| K = 2(Set 1, Two Sets are 1D/1D) | 12 | 4 |
| K = 2(Set 1, Two Sets are 1L/1L) | 12 | 4 |

Or as shown in the following table, this table corresponds to the case in which the maximum value of K is 2:

TABLE 16

|  | Set 1 | Set 2 | Set 3 |
| --- | --- | --- | --- |
| K = 1 | 16 | — | — |
| K = 2(2 Sets are 1D/1L) | 8 | 8 | — |
| K = 2(2 Sets are 1D/1D) | 12 | 4 | — |
| K = 3(3 Sets are 1L/1L/1D) | 4 | 4 | 8 |
| K = 3(3 Sets are 1L/1D/1D) | 8 | 6 | 2 |

After the amount of the blindly detected ePDCCHs corresponding to Set i is determined, similar to the above, the specific ePDCCHs needed to be detected may then be determined, and then the blind detection is performed.

Embodiment 5

The First Type of Parameter at Least Includes the Value of K, the Index i, and the Configuration of the D/L Type of Set i In the subframe S, the base station configures K ePDCCH resource sets for the terminal, the terminal may determine the amount of the blindly detected ePDCCHs according to the value of K, the index i, and the D/L type corresponding to Set i, as shown in the following table, which corresponds to the case in which the maximum value of K is 2. The D/L type may be configured by base station through signaling.

TABLE 17

|  | Set 1 | Set 2 |
| --- | --- | --- |
| K = 1 | 16 | — |
| K = 2 | If type is D, then detect for 10 times | If type is L, then detect for 8 times |
|  | If type is L then detect for 6 times | If type is L then detect for 8 times |

After the amount of the blindly detected ePDCCHs corresponding to Set i is determined, similar to the above, the specific ePDCCHs needed to be detected may then be determined, and then the blind detection is performed.

There is an implementation way equivalent to the above method, that is, the base station jointly encodes the value of K, the D/L type of the K ePDCCH resource sets, and the amount of the candidates needed to be detected, and performs notification.

Embodiment 6

The First Type of Parameter at Least Includes the Value of K, the Index i, the D/L Type Corresponding to the K ePDCCH Resource Sets, and the Value of N of the K ePDCCH Resource Sets In the subframe S, the base station configures K ePDCCH resource sets for the terminal, the terminal may determine the amount of the blindly detected ePDCCHs according to the value of K, the index i, a configuration of the D/L type of the K ePDCCH resource sets, and the configuration of the value of N of the K ePDCCH resource sets, as shown in the following table, which corresponds to the case in which the maximum value of K is 2.

TABLE 18

|  | Set 1 | Set 2 |
| --- | --- | --- |
| K = 1, Regardless of whether type of Set is D or L | 16 | — |
| K = 2(Set1, types of 2 Sets are separately D and L, values of N of 2 Sets are separately 4 and 8) | 6 | 10 |
| K = 2(Set1, types of 2 Sets are separately D and L, values of N of 2 Sets are separately 4 and 4) | 8 | 8 |
| K = 2(Set1, types of 2 Sets are separately D and D, values of N of 2 Sets are separately 4 and 8) | 10 | 6 |
| K = 2(Set1, types of 2 Sets are separately L and L, values of N of 2 Set are separately 4 and 4) | 12 | 4 |

After the amount of the blindly detected ePDCCHs corresponding to Set i is determined, similar to the above, the specific ePDCCHs needed to be detected may then be determined, and then the blind detection is performed.

There is an implementation way equivalent to the above method, that is, the base station jointly encodes the value information of K, the D/L type of the K ePDCCH resource sets, the value of N, and the amount of the candidates needed to be detected, and performs notification.

Embodiment 7

The First Type of Parameter Further Includes Blind Detection Times Allocation Signaling or the Amount of High Layer ePDCCH Candidates For example, the amount of the ePDCCHs needed to be blindly detected in set i is determined according to the value of K or the value of K and the index i and high layer blind detection allocation signaling by the following way:

TABLE 19

|  | Set 1 | Set 2 |
| --- | --- | --- |
| K = 1 | 16 | — |
| K = 2, high layer blind detection allocation signaling bit is 0 | 8 | 8 |
| K = 2, high layer blind detection allocation signaling bit is 1 | 12 | 4 |

Or

TABLE 20

|  | Set 1 | Set 2 |
| --- | --- | --- |
| K = 1 | 16 | — |
| K = 2, high layer blind detection allocation signaling bit is 00 | 8 | 8 |
| K = 2, high layer blind detection allocation signaling bit is 01 | 12 | 4 |
| K = 2, high layer blind detection allocation signaling bit is 10 | 10 | 6 |
| K = 2, high layer blind detection allocation signaling bit is 11 | 14 | 2 |

Or the amount of the ePDCCHs needed to be blindly detected in set i is determined according to the value of K, the index i, the value of N (N1 to Nk) of the K ePDCCH resource sets and the high layer blind detection allocation signaling by the following way:

TABLE 21

|  | Set 1 | Set 2 |
| --- | --- | --- |
| K = 1 | 16 | — |
| K = 2, high layer blind detection allocation signaling bit is 0 | floor((N1*16)/ (N1 + N2)) | 16- floor((N1*16)/ (N1 + N2)) |
| K = 2, high layer blind detection allocation signaling bit is 1 | floor((a*N1*16)/ (a*N1 + b*N2)) | 16- floor((a*N1*16)/ (a*N1 + b*N2)) | wherein a and b are any positive number, N1 and N2 separately represent the amount of PRB pairs contained in Set1 and Set2.

Or the number of times of the blind detection in Set i is determined according to the value of K, the index i, the value of N of Set i and the high layer blind detection allocation signaling by the following way:

TABLE 22

|  | Set 1 | Set 2 |
| --- | --- | --- |
| K = 1 | 16 | — |
| K = 2, high layer blind detection allocation signaling bit is 0 | N1 | 16 − N1 |
| K = 2, high layer blind detection allocation signaling bit is 1 | N1 | N2 |

After the amount of the blindly detected ePDCCHs corresponding to Set i is determined, similar to the above, the specific ePDCCHs needed to be detected may then be determined, and then the blind detection is performed.

In the cases of Embodiment 4, 5, and 6, allocation of amount of the ePDCCHs needed to be blind detection may also be determined in combination with a blind detection allocation signaling of the base station. In general, this blind detection allocation signaling does not directly allocate the amount of the ePDCCHs needed to be blindly detected, therefore overhead is low.

Embodiment 8

The First Type of Parameter May Further Include the Amount of eREG Contained in the Subframe S by eCCE For example, the amount of the ePDCCHs needed to be blindly detected in set i is determined according to the value of K or the value of K and the index i, and the amount of the eREG contained by the eCCE, and in accordance with the following way:

TABLE 23

|  | Set 1 | Set 2 |
| --- | --- | --- |
| K = 1 | 16 | — |
| K = 2, amount of eREG contained by eCCE is 4 | 8 | 8 |
| K = 2, amount of eREG contained by eCCE is 8 | 12 | 4 |

Or the amount of the ePDCCHs needed to be blindly detected in set i is determined according to the value of K, the index i, the value of N (N1 to Nk) of the K ePDCCH resource sets, and the amount of the eREGs contained in the eCCE in the subframe S by the following way:

TABLE 24

|  | Set 1 | Set 2 |
| --- | --- | --- |
| K = 1 | 16 | — |
| K = 2, the amount of eREGs contained in eCCE is 4 | floor((N1*16)/ (N1 + N2)) | 16- floor((N1*16)/ (N1 + N2)) |
| K = 2, the amount of eREGs contained in eCCE is 8 | floor((a*N1*16)/ (a*N1 + b*N2)) | 16- floor((a*N1*16)/ (a*N1 + b*N2)) | wherein a and b are any positive number, N1 and N2 separately represent the amount of PRB pairs contained in Set1 and Set2.

Or the amount of the ePDCCHs needed to be blindly detected in set i is determined according to the value of K, the index i, the value of N of Set i, and the amount of the eREGs contained in the eCCE in the subframe S by the following way:

TABLE 25

|  | Set 1 | Set 2 |
|---|---|---|
| K = 1 | 16 | — |
| K = 2, the amount of eREGs contained in eCCE is 4 | N1 | 16 − N1 |
| K = 2, the amount of eREGs contained in eCCE is 8 | N1 | N2 |

After the amount of the blindly detected ePDCCHs corresponding to Set i is determined, similar to the above, specific ePDCCHs needed to be detected may then be determined, and then the blind detection is performed.

In the cases of Embodiment 4, 5, and 6, allocation of the number of times of the blind detection may also be determined in combination with the amount of the eREGs contained in the eCCE in the subframe S.

Embodiment 9

The amount of the ePDCCHs needed to be detected in Set i may be determined according to the value of K or the value of K and the index i and the ALs needed to be detected by the K ePDCCH resources sets by the following way:

TABLE 26

|  | Set 1 | Set 2 |
|---|---|---|
| K = 1 | 16 | — |
| K = 2, the amount of ALs needed to be detected in set 1 is smaller than that needed to be detected in set 2 | 8 | 8 |
| K = 2, K = 2, the amount of ALs needed to be detected in set 1 is larger than that needed to be detected in set 2 | 12 | 4 |

Or the number of times of the blind detection in Set i is determined according to the value of K or the value of K and the index i and the ALs needed to be detected in set i by the following way:

TABLE 27

|  |  | Set 1 | Set 2 |
|---|---|---|---|
| K = 1 |  | 17 | — |
| K = 2 | AL 1, 2, 4 | 6 | 17-Set1 blind detection times |
|  | AL 1, 2, 4, 8 | 8 | 17-Set1 blind detection times |
|  | AL 1, 2 | 4 | 17-Set1 blind detection times |

After the amount of the blindly detected ePDCCHs corresponding to Set i is determined, similar to the above, specific ePDCCHs needed to be detected may then be determined, and then the blind detection is performed.

There is an implementation way equivalent to the above method, that is, the base station jointly encodes information of K and the amount of the candidates needed to be detected by the K ePDCCH resource sets, and performs notification.

Embodiment 10

If the subframe S is a non-special subframe, or a special subframe of which the configuration types are 3, 4, and 8, and is a NCP subframe, and if an RE which can be used to transmit the ePDCCH in a PRB pair is smaller than a certain threshold X, for example 104, then this case is defined as Case A, while other cases are defined as Case B, and the amount of the ePDCCHs needed to be detected may be determined according to the following standard:

TABLE 28

|  | Set 1 | Set 2 |
|---|---|---|
| K = 1 | 16 | — |
| K = 2, Case A | 8 | 8 |
| K = 2, Case B | 12 | 4 | or:

TABLE 29

|  | Set 1 | Set 2 |
|---|---|---|
| K = 1 | 16 | — |
| K = 2, Case A | N1 | 16 − N1 |
| K = 2, Case B | N1 | N2 | or:

TABLE 30

|  | Set 1 | Set 2 |
|---|---|---|
| K = 1 | 16 | — |
| K = 2, Case A | floor((N1*16)/(N1 + N2)) | 16-floor((N1*16)/(N1 + N2)) |
| K = 2, Case B | floor((a*N1*16)/(a*N1 + b*N2)) | 16-floor((a*N1*16)/(a*N1 + b*N2)) |

When other cases in Embodiment 1 to 9, the number of times of the blind detection may also be determined according to the different conditions in Case A and Case B. Here, Case A and Case B may also be classified like this:

if the subframe S is a non-special subframe, or a special subframe of which the configuration types are 3, 4, and 8, and is a NCP subframe, and if a RE which can be used to transmit the ePDCCH in the eCCE is smaller than a certain threshold Y, for example 26, then this case may be defined as Case A, while other cases may be defined as Case B;

or if the subframe S is a non-special subframe, or a special subframe of which the configuration types are 3, 4, and 8, and is a NCP subframe, then this case may be defined as Case A, while other cases may be defined as Case B;

or if a certain DCI Format, for example DCI Format 1A or 2C, is transmitted in the subframe S using one eCCE, a code rate is smaller than a threshold Z, for example 0.8, then this case may be defined as Case A, while other cases may be defined as Case B;

wherein definitions of the special subframe, the non-special subframe, a Norma CP subframe, and an Extend CP subframe may be obtained with reference to a 3GPP TS 36.211 standard;

after determining the amount of the blindly detected ePDCCHs corresponding to Set i, similar to the above, specific ePDCCHs needed to be detected may then be determined, and then the blind detection is performed.

Embodiment 11

The amount X(i) of ePDCCHs detected in Set i may be determined only according to a AL set detected in set i.

For example, the UE and the terminal predefine that, if AL 1 is needed to be detected when any ePDCCH resource set is configured, then 4 ePDCCHs are corresponding, AL 2 corresponds to 4 ePDCCHs, AL 4 corresponds to 2 ePDCCHs, AL 8 corresponds to 2 ePDCCHs, AL 16 corresponds to 1 ePDCCH, AL 32 corresponds 1 ePDCCH, in this way, the UE may then determine the amount of the ePDCCHs needed to be detected according to the situation of the ALs needed to be detected in set i.

Other correspondence between the AL and the blind detection times may also be adopted, for example:

the UE and the terminal predefine that, if AL 1 is needed to be detected when any ePDCCH resource set is configured, then 6 ePDCCHs are corresponding, AL 2 corresponds to 6 ePDCCHs, AL 4 corresponds to 2 ePDCCHs, AL 8 corresponds to 2 ePDCCHs, AL 16 corresponds to 1 ePDCCH, AL 32 corresponds to 1 ePDCCH, in this way, the UE may then determine the number of times of the blind detection according to the situation of the ALs needed to be detected in set i;

for example, if K=1, Set 1 corresponds to AL=1, 2, 4, 8, 16, the terminal may then determine that the amount of the ePDCCHs needed to be detected is 13 according to the corresponding AL. If the corresponding AL=1, 2, 4, 8, the terminal may then determine that the amount of the ePDCCHs needed to be detected is 12 according to the corresponding AL.

For example, if K=2, the AL corresponding to Set 1 is 1, 2, 4, 8. The terminal may then determine the amount of the ePDCCHs needed to be detected is 12; the AL corresponding to Set 2 is 8, 16, then Set 2 only needs to detect 3 ePDCCHs.

After the amount of the blindly detected ePDCCHs corresponding to Set i is determined, similar to the above, specific ePDCCHs needed to be detected may then be determined, and then the blind detection is performed.

There is an implementation way equivalent to the above method, that is the base station jointly encodes AL information needed to be detected in set and the amount of the candidate needed to be detected, and performs notification.

Embodiment 12

The amount X(i) of ePDCCHs detected in Set i may be determined according to detected AL sets AL(1) to AL(k) separately corresponding to the K ePDCCH resource sets.

For example, the UE and the terminal predefine that, a total amount of the ePDCCHs detected by all ePDCCH resources sets is 4 in the case of AL 1; the total amount of ePDCCHs detected by all ePDCCH resources sets is 4 in the case of AL 2; the total amount of the ePDCCHs detected by all ePDCCH resources sets is 2 in the case of AL 4; the total amount of the ePDCCHs detected by all ePDCCH resources sets is 2 in the case of AL 8; the total amount of the ePDCCHs detected by all ePDCCH resources sets is 1 in the case of AL 16; in this way, the UE may then determine the amount of the ePDCCHs needed to be detected in set i according to ALs.

First, it is necessary to define that at most only one ePDCCH resource set needs to detect AL 16 and AL 32, at most only 2 ePDCCH resource sets need to detect AL 4 and AL 8. At most p ePDCCH resource sets need to detect AL=1 and 2, and p is not larger than 4.

Then, when there are 2 ePDCCH resource sets, and if the ALs needed to be detected in set 1 are 1, 2, 4, 8; the ALs needed to be detected in set 2 are 4, 8, 16; then when AL=1, only Set 1 in all ePDCCH resource sets performs detection, that is Set 1 detects 4 ePDCCHs; then when AL=2, only Set 1 in all ePDCCH resource sets performs detection, that is, Set 1 detects 4 ePDCCHs. When AL=4, both 2 ePDCCH resource sets perform detection, totally 2 ePDCCHs are detected, then Set 1 detects 1 ePDCCH, and Set 2 detects 1 ePDCCH. When AL=8, both 2 ePDCCH resource sets perform detection, totally 2 ePDCCHs are detected, then Set 1 detects 1 ePDCCH, and Set 2 detects 1 ePDCCH. When AL=16, only Set 2 performs detection, then Set 2 detects 1 ePDCCH.

The summary of the above detection is that: Set 1 detects 4 ePDCCHs when AL=1, Set 1 detects 4 ePDCCHs when AL=2, Set 1 detects 1 ePDCCH when AL=4, Set 1 detects 1 ePDCCH when AL=8, that is, totally 10 ePDCCHs are detected; Set 2 detects 1 ePDCCH when AL=4, Set 2 detects 1 ePDCCH when AL=8, and so is the case when AL=16, that is, totally 3 ePDCCHs are detected.

There may be other cases, for example K=3,

Detection by Set 1: AL=1, 2;
Detection by Set 2: AL=1, 2, 4;
Detection by Set 3: AL=2, 4, 8;

Then when AL=1, Set 1 and Set 2 in all ePDCCH resource sets need to perform detection, the case may be that Set 1 detects 2 ePDCCHs, and Set 2 detects 2 ePDCCHs (not be limited to this case; another case may be that Set 1 detects 3 ePDCCHs, and Set 2 detects 1 ePDCCH; and a specific case is predetermined), then when AL=2, Set 1, Set 2 and Set 3 in all ePDCCH resource sets perform detection, the allocation may be that Set 1 detects 2 ePDCCHs, Set 2 detects 1 ePDCCH, and Set 3 detects 1 ePDCCH. When AL=4, Set 2 and Set 3 may perform detection, the total amount of ePDCCHs is 2, then Set 2 may detect 1 ePDCCH, and Set 3 may detect 1 ePDCCH. When AL=8, only Set 3 may perform detection, the total amount of ePDCCHs is 2.

The summary of the detection is that: Set 1 detects 2 ePDCCHs when AL=1, the Set 1 detects 2 ePDCCHs when AL=2, that is, totally 4 ePDCCHs are detected. Set 2 detects 2 ePDCCHs when AL=1, Set 2 detects 1 ePDCCH when AL=2, Set 2 detects 1 ePDCCH when AL=4, that is, totally 4 ePDCCHs are detected. Set 3 detects 1 ePDCCH when AL=1, Set 3 detects 1 ePDCCH when AL=4, Set 3 detects 2 ePDCCHs when AL=8, that is, totally 4 ePDCCHs are detected.

After the amount of the blindly detected ePDCCHs corresponding to Set i is determined, similar to the above, specific ePDCCHs needed to be detected may then be determined, and then the blind detection is performed.

There is an implementation way equivalent to the above method, that is, the base station jointly encodes ALs needed to be detected by K Sets and the amount of the candidates needed to be detected by the K Sets, and performs notification.

Embodiment 13

The amount X(i) of detected ePDCCHs in Set i may be determined according to the AL sets AL(1) to AL(k) separately corresponding to K ePDCCH resource sets and the D/L type of the K ePDCCH resource sets;

for example, the UE and the terminal predefine that the total amount of the ePDCCHs detected by all ePDCCH resource sets is 6 in the case of AL 1; the total amount of the ePDCCHs detected by all ePDCCH resource sets is 6 in the case of AL 2; the total amount of the ePDCCHs detected by all ePDCCH resource sets is 3 in the case of AL 4; the total amount of the ePDCCHs detected by all ePDCCH resource sets is 3 in the case of AL 8; the total amount of the ePDCCHs detected by all ePDCCH resource sets is 1 in the case of AL 16; in this way, the UE may then further determine the amount of the blindly detected ePDCCHs according to the D/L type of the K ePDCCH resource sets and the AL needed to be detected by Set i.

First it is necessary to define that at most only one ePDCCH resource set needs to detect AL 16 and AL 32, at most only 2 ePDCCH resource sets need to detect AL 4 and AL 8. At most p ePDCCH resource sets need to detect AL 1 and AL 2, and p is not larger than 6.

Then, when there are 2 ePDCCH resource sets, if:
the AL needed to be detected by Set 1 is 1, 2, 4, 8;
the AL needed to be detected by Set 2 is 2, 4, 8, 16;

TABLE 31

|        | Set 1      | Set 2      |
|--------|------------|------------|
| AL = 1 | Detect     | Not detect |
| AL = 2 | Detect     | Detect     |
| AL = 4 | Detect     | Detect     |
| AL = 8 | Detect     | Detect     |
| AL = 16| Not detect | Detect     | then when only Set 1 corresponds to the detection of AL 1, 6 ePDCCHs are detected.

When both Set 1 and Set 2 correspond to the detection of AL 2, if Set 1 is of the Type D, and Set 2 is of the Type L, then Set 1 detects 2 ePDCCHs, and Set 2 detects 4 ePDCCHs; if Set 1 is of the Type L and Set 2 is of the Type D, then Set 1 detects 4 ePDCCHs and Set 2 detects 2 ePDCCHs; if both Set 1 and Set 2 are of the Type D or the Type L, then each of Set 1 and Set 2 detects 3 ePDCCHs;

when both Set 1 and Set 2 correspond to the detection of AL 4, if Set 1 is of the Type D and Set 2 is of the Type L, then Set 1 detects 1 ePDCCH and Set 2 detects 2 ePDCCHs; if Set 1 is of the Type L and Set 2 is of the Type D, then Set 1 detects 2 ePDCCHs and Set 2 detects 1 ePDCCH; if both Set 1 and Set 2 are of the Type D or the Type L, then Set 1 detects 2 ePDCCHs and Set 2 detects 1 ePDCCH;

when both Set 1 and Set 2 correspond to the detection of AL 8, if Set 1 is of the Type D and Set 2 is of the Type L, then Set 1 detects 1 ePDCCH and Set 2 detects 2 ePDCCHs; if Set 1 is of the Type L and Set 2 is of the Type D, then Set 1 detects 2 ePDCCHs and Set 2 detects 1 ePDCCH; if both Set 1 and Set 2 are of the Type D or the Type L, then Set 1 detects 2 ePDCCHs, and Set 2 detects 1 ePDCCH.

When only Set 2 corresponds to the detection of AL 16, 1 ePDCCH is detected.

After the amount of the blindly detected ePDCCHs corresponding to Set i is determined, similar to the above, a specific ePDCCH needed to be detected may then be determined, and then the blind detection is performed.

There is an implementation way equivalent to the above method, that is, the base station needs to jointly encode information of an AL needed to be detected by K Sets, the amount of the candidates needed to be detected by the K Sets, and the D/L type of the K sets, and performs notification.

Embodiment 14

The amount X(i) of ePDCCHs detected in Set i may be determined only according to an AL set detected in set i and the D/L type of Set i;

For example, the UE and the terminal predefine that in a case where AL 1 is needed to be detected when any ePDCCH resource set is configured, if the type of the ePDCCH resource set is distributed, then there are 2 ePDCCHs corresponding; if the type of the ePDCCH resource set is localized, then there are 4 ePDCCHs corresponding.

In a case where AL 2 is needed to be detected when any ePDCCH resource set is configured, if the type of the ePDCCH resource set is distributed, then there are 4 ePDCCHs corresponding; if the type of the ePDCCH resource set is localized, then there are 2 ePDCCHs corresponding.

In a case where AL 4 is needed to be detected when any ePDCCH resource set is configured, if the type of the ePDCCH resource set is distributed, then there is 1 ePDCCH corresponding; if the type of the ePDCCH resource set is localized, then there is 1 ePDCCH corresponding.

In a case where AL 8 is needed to be detected when any ePDCCH resource set is configured, if the type of the ePDCCH resource set is distributed, then there is 1 ePDCCH corresponding, if the type of the ePDCCH resource set is localized, then there is 1 ePDCCH corresponding.

In a case where AL 16 is needed to be detected when any ePDCCH resource set is configured, if the type of the ePDCCH resource set is distributed, then there is 1 ePDCCH corresponding, if the type of the ePDCCH resource set is localized, then the case that the configuration is AL=16 is not allowed.

For example, if K=1, Set 1 corresponds to AL=1, 2, 4, 8, 16, the type of the ePDCCH resource set is Distributed, the terminal may then determine according to the corresponding AL that the amount of the ePDCCHs needed to be detected is 9. If the corresponding AL=1, 2, 4, 8 and the type of the ePDCCH resource set is localized, then the terminal may then determine according to the corresponding AL that the amount of the ePDCCHs needed to be detected is 8.

For example, K=2, the ALs corresponding to Set 1 are 1, 2, 4, 8, the type is localized, the terminal may then determine the amount of the ePDCCHs needed to be detected is 8; the ALs corresponding to Set 2 are 4, 8, 16, and the type is distributed, then Set 2 only needs to detected 3 ePDCCHs.

After the amount of the blindly detected ePDCCHs corresponding to Set i is determined, similar to the above, a specific ePDCCH needed to be detected may then be determined, and then the blind detection is performed.

There is an implementation way equivalent to the above method, that is, the base station jointly encodes the amount of the candidates needed to be detected by K Sets, and the D/L type of the K sets, and performs notification.

Embodiment 15

Based on Embodiment 13, a method for determination may further introduce the value of N.

Both Set 1 and Set 2 correspond to the detection of AL 2, if Set 1 is of the Type D, Set 2 is of the Type L, if the amount N1 of the PRB pairs contained in Set 1 is smaller than or equal to the amount N2 of the PRB pairs contained in Set 2, then Set 1 detects 2 ePDCCHs, Set 2 detects 4 ePDCCHs;

if the amount N1 of the PRB pairs contained in Set 1 is larger than or equal to the amount N2 of the PRB pairs contained in Set 2, then Set 1 detects 3 ePDCCHs, and Set 2 detects 3 ePDCCHs;

if Set 1 is of the Type L and Set 2 is of the Type D, and if the amount N1 of the PRB pairs contained in Set 1 is smaller than or equal to the amount N2 of the PRB pairs contained in Set 2, then Set 1 detects 4 ePDCCHs and Set 2 detects 2 ePDCCHs; if the amount N1 of the PRB pairs contained in Set 1 is larger than or equal to the amount N2 of the PRB pairs contained in Set 2, then Set 1 detects 3 ePDCCHs, and Set 2 detects 3 ePDCCHs. If both Set 1 and Set 2 are of the Type D or Type L, then each one of Set 1 and Set 2 detects 3 ePDCCHs.

The case corresponding to other AL is similar to this, and the UE needs to determine the amount of the ePDCCHs needed to be detected by Set i only according to the value of N of the K ePDCCH resource sets, the AL allocation and the D/L allocation.

There is an implementation way equivalent to the above method, that is, the base station jointly encodes the information of an AL needed to be detected by the K Sets, the amount of the candidates needed to be detected by the K Sets, the D/L type of the K sets, and the value of N of the K Sets, and performs notification.

Embodiment 16

Based on Embodiment 14, the method for determination may further introduce the value of N.

For example, the UE and the terminal predefine that, if AL 1 is needed to be detected when any ePDCCH resource set is configured, if the type of the ePDCCH resource set is distributed, and if N is not larger than 4, then there are 2 ePDCCHs corresponding, if N is larger than 4, then there are 4 ePDCCHs corresponding; if the type of the ePDCCH resource set is localized, and if N is not larger than 4, then there are 2 ePDCCHs corresponding, if N is larger than 4, then there are 6 ePDCCHs corresponding.

Other AL cases are similar to this.

There is an implementation way equivalent to the above method, that is, the base station jointly encodes the amount of the candidates needed to be detected by Set i, the D/L type of Set i, and the value information of N, and performs notification.

Embodiment 17

With regard to the case in Embodiment 14, the amount of the ePDCCHs needed to be detected may be determined through part or all of the ALs and in combination with configuration signaling of the amount of the blindly detected ePDCCHs, for example:

if AL 1 is needed to be detected when any ePDCCH resource set is configured, if the type of the ePDCCH resource set is distributed, and if a blind detection configuration signaling bit of a base station is 0, then there are 2 ePDCCHs corresponding; if the blind detection configuration signaling bit of the base station is 1, then there are 4 ePDCCHs corresponding. If the type of the ePDCCH resource set is localized, and if the blind detection configuration signaling bit of the base station is 0, then there are 2 ePDCCHs corresponding; if the blind detection configuration signaling bit of the base station is 1, then there are 6 ePDCCHs corresponding.

Based on other embodiments, the amount of the ePDCCHs needed to be detected is also determined easily in combination with the configuration signaling of the amount of the blindly detected ePDCCHs, the specific principle is similar to this embodiment.

Embodiment 18

The amount of the ePDCCHs needed to be detected may be determined through part or all of the AL and in combination with the amount of the eREGs contained in the eCCE in the subframe S, for example:

if AL 1 is needed to be detected when any ePDCCH resource set is configured, if the type of the ePDCCH resource set is distributed, and if the amount of the eREGs contained in the eCCE is 4, then there are 2 ePDCCHs corresponding; if the amount of the eREGs contained in the eCCE is 8, then there are 4 ePDCCHs corresponding. If the type of the ePDCCH resource set is localized, and if the amount of the eREGs contained in the eCCE is 4, then there are 2 ePDCCHs corresponding; if the amount of the eREGs contained in the eCCE is 8, then there are 6 ePDCCHs corresponding.

Based on other embodiments, the amount of the ePDCCHs needed to be detected is also determined easily in combination with the amount of the eREGs contained in the eCCE, the specific principle is similar to this embodiment.

Embodiment 19

If the subframe S is a non-special subframe, or a special subframe of which the configuration types are 3, 4, 8, and is a NCP subframe, and if the RE which can be used to transmit ePDCCH in the PRB pair is less than a certain threshold X, for example 104, then this case is defined as Case A, while other cases are defined as Case B, the amount of the ePDCCHs needed to be detected may be determined through part or all of the AL and in combination with the amount of the eREGs contained in the eCCE in the subframe S, for example:

if AL 1 is needed to be detected when any ePDCCH resource set is configured, if the type of the ePDCCH resource set is distributed, then there are 2 ePDCCHs corresponding in Case A, and there are 4 ePDCCHs corresponding in Case B. If the type of the ePDCCH resource set is localized, then there are 2 ePDCCHs corresponding in Case A, and there are 6 ePDCCHs corresponding in Case B.

Other ALs are similar to this.

The classification of Case A and Case B may be obtained with reference to the above embodiments. Other methods for classification may also be obtained according to a subframe type, a code rate, the amount of the REs in the eCCE which can be used to transmit the ePDCCH, and other parameters.

Based on other embodiments, the amount of the ePDCCHs needed to be detected is also determined easily in combination with the encoding rate corresponding to the DCI Format in the subframe S, the amount of the REs in the PRB pair in the subframe S which can be used to transmit the ePDCCHs, and the amount of the REs in the eCCE of the subframe S which can be used to transmit the ePDCCHs, the specific principle is similar to this embodiment.

Embodiment 20

The amount X(i) of ePDCCHs detected in Set i may be determined only according to blind detection signaling of the base station. For example the base station allocates the amount of the ePDCCHs blindly detected by each ePDCCH resource set, or allocates the number of times of the blind detection, each ePDCCH resource set corresponds to one allocation parameter. The terminal determines the amount of the ePDCCHs blindly detected by each ePDCCH resource set or the number of times of the blind detection according to this parameter.

Or several other ways for blind detection allocation may be predefined; the terminal determines a specific way according to indication signaling of the base station.

It is also possible that, the base station allocates the blind detection times corresponding to each AL, and the terminal determines the amount of the ePDCCHs needed to be detected according to the AL needed to be detected, and the allocation signaling of each AL.

Embodiment 21

The amount of the ePDCCHs needed to be detected by Set i is determined based on Embodiment 20 and further in combination with the amount of the eREGs contained in the eCCE in the subframe S.

For example, the amount of the ePDCCHs needed to be detected by Set i is determined based on Embodiment 20 and further in combination with an encoding rate corresponding to the encoding rate corresponding to the DCI Format in the subframe S, the amount of REs which can be used to transmit the ePDCCH in the PRB pair in the subframe S, and the amount of REs which can be used to transmit the ePDCCH in the eCCE in the subframe S.

The principle of this embodiment is similar to that of Embodiment 18 and Embodiment 19.

Embodiment 22

The base station notifies through signaling the amount of the candidates needed to be detected by each Set, or the blind detection times;

for example, when K=2, the base station indicates through high layer signaling:
the amount of the candidates detected by Set 1 is 8;
the amount of the candidates detected by Set 2 is 8;
or,
the amount of the candidates detected by Set 1 is 10;
the amount of the candidates detected by Set 2 is 6;
or,
the amount of the candidates detected by Set 1 is 4;
the amount of the candidates detected by Set 2 is 12;
other cases of indication through the high layer signaling are also available.

For example, when K=2 the base station indicates through the high layer signaling:
the amount of the candidates detected by Set 1 is 6;
the amount of the candidates detected by Set 2 is 6;
the amount of the candidates detected by Set 3 is 4;
or,
the amount of the candidates detected by Set 1 is 8;
the amount of the candidates detected by Set 2 is 6;
the amount of the candidates detected by Set 3 is 2;
other cases of indication through the high layer signaling is also available.

The base station can flexibly allocate the detection times of each Set through the control signaling.

Embodiment 23

The base station notifies through signaling the amount of the candidates corresponding to a corresponding AL or the blind detection times, in each set, as shown in Table 32:

TABLE 32

|  |  | Set 1 | Set 2 | Set 3 |
|---|---|---|---|---|
| K = 1 | n = 8: | AL = {1, 2, 4, 8, 16(WA)} | Null | Null |
|  | n = 4: | AL = {1, 2, 4, 8} |  |  |
|  | n = 2: | AL = {1, 2, 4} |  |  |
| K = 2 | n = 8: | AL = {4, 8, 16} | AL = {1, 2} | Null |
|  | n = 4: | AL = {4, 8} | AL = {1, 2} |  |
|  | n = 2: | AL = {4} | AL = {1, 2} |  |
| K = 2 | n = 8: | AL = {4, 8, 16} | AL = {1, 2} | Null |
|  | n = 4: | AL = {4, 8} | AL = {1, 2} |  |
|  | n = 2: | AL = {4} | AL = {1, 2} |  |
| K = 2 | n = 8: | AL = {1, 2} | AL = {4, 8, 16} | Null |
|  | n = 4: | AL = {1, 2} | AL = {4, 8} |  |
| K = 3 | n = 8: | AL = {4, 8, 16} | AL = {1, 2} | AL = {4} |
|  | n = 4: | AL = {4, 8} | AL = {1, 2} | AL = {4} |
|  | n = 2: | AL = {2, 4} | AL = {1, 2} | AL = {4} |
| K = 3 | n = 8: | AL = {4, 8} | AL = {1, 2} | AL = {4} |
|  | n = 4: | AL = {2, 4} | AL = {1, 2} | AL = {4} |

For example K=2, and n=8 (here n is a parameter for determining the amount of the PRBs contained in the Set), as shown in the following table:

TABLE 33

|  | Set 1 | Set 2 | Set 3 |
|---|---|---|---|
| K = 1 | D, N = n | — | — |
| K = 2 | D, N = n | L, N = n | — |
| K = 2 | D, N = n | D, N = n |  |
| K = 2 | D, N = n/2 | D, N = n |  |
| K = 3 | D, N = n | L, N = n | L, N = n |
| K = 3 | D, N = n/2 | L, N = n/2 | L, N = n |

AL=4, 8, 16 are needed to be detected for Set 1, the Set 1 is allocated through high layer signaling notification signaling, AL=4 corresponds to 2 candidates, AL=8 corresponds to 1 candidate, and AL=16 corresponds to 1 candidate. Set 2 is allocated, AL=1 corresponds to 6 candidates, and AL=2 corresponds to 6 candidates.

For example, K=2, and n=4, AL=4, 8 are needed to be detected for Set 1, Set 1 is allocated through the high layer signaling notification signaling, AL=4 corresponds to 2 candidates; Set 1 is allocated through the high layer signaling notification signaling, and AL=8 corresponds to 1 candidate; for Set 1, AL=1, 2 are needed to be detected. Set 2 is allocated through the high layer signaling notification signaling, and AL=1 corresponds to 7 candidates; Set 2 is allocated through the high layer signaling notification signaling, and AL=2 corresponds to 6 candidates.

Other cases are similar to this, and the allocation of the amount of the blindly detected candidates is also notified through the signaling separately for each AL needed to be detected by each Set.

Embodiment 24

For the case in which the eCCE contains different eREGs, the base station may separately notify the information of K and the allocation information of the amount of the candidates blindly detected by the K Sets.

In conclusion, the methods and the devices in the embodiments of the disclosure for detecting control signaling and implementing control signaling detection can determine the blind detection times or the amount of the ePDCCHs allocated by each ePDCCH resource set, thus can determine the ePDCCH needed to be detected in each ePDCCH resource set.

All those described above are only embodiments of the disclosure, and are not used to limit the scope of protection of the disclosure.

What is claimed is:

1. A method for detecting control signaling, comprising:
detecting, by a terminal, control signaling in K enhanced Physical Downlink Control channel (ePDCCH) resource sets in a subframe, wherein K is an integer greater or equal to 1,
detecting a number of ePDCCHs by the terminal in Set i of the K ePDCCH resource sets wherein the number of ePDCCH resource sets is X(i), i is an integer, and 0<i<=K, at least one of the X(i) is determined according to a first type of parameter, and the first type of parameter at least comprises a value of K or comprises the value of K and an index i of the K ePDCCH resource sets,
and
wherein the first type of parameter comprises at least one of
a subframe type,
an encoding rate corresponding to a Downlink Control Information Format (DCI Format) in the subframe,
a number of Resource Elements (RE) which are capable of transmitting the ePDCCHs in a Physical Resource Block (PRB) pair in the subframe, or
a number of REs which are capable of transmitting the ePDCCHs in an eCCE in the subframe.

2. The method according to claim 1, wherein
the first type of parameter at least comprises the value of K, the index i, and a value of N of the K ePDCCH resource sets; or
the first type of parameter at least comprises the value of K, the index i, and a value of N of the Set i; or
the first type of parameter at least comprises the value of K, the index i, and a configuration of a Distributed/Localized (D/L) type of the K ePDCCH resource sets; or
the first type of parameter at least comprises the value of K, the index i, and a configuration of a D/L type of the Set i; or
the first type of parameter at least comprises the value of K, the index i, a D/L type corresponding to the K ePDCCH resource sets, and a value of N of the K ePDCCH resource sets,
wherein N is an aggregation level.

3. The method according to claim 2, wherein
the first type of parameter further comprises high layer signaling for allocating the number of blind detections or a number of ePDCCH candidates; or
the first type of parameter further comprises a number of enhanced Resource Element Groups (eREG) contained in an enhanced Control Channel Element (eCCE) in the subframe; or
the first type of parameter further comprises an Aggregation Level (AL) needed to be detected in the Set i, or an AL needed to be detected in the K ePDCCH resource sets.

4. A method for detecting control signaling, comprising:
detecting, by a terminal, control signaling in K enhanced Physical Downlink Control channel (ePDCCH) resource sets in a subframe, wherein K is an integer greater or equal to 1,
detecting a number of ePDCCHs by the terminal in Set i of the K ePDCCH resource sets, wherein the number of ePDCCH resource sets is X(i), i is an integer, and 0<i<=K, at least one of the X(i) is determined according to a first type of parameter, and the first type of parameter at least comprises an Aggregation Level (AL) set detected in the Set i or detected AL sets separately corresponding to the K ePDCCH resource sets,
and
wherein the first type of parameter comprises at least one of
a subframe type,
an encoding rate corresponding to a Downlink Control Information Format (DCI Format) in the subframe,
a number of Resource Elements (RE) which are capable of transmitting the ePDCCHs in a Physical Resource Block (PRB) pair in the subframe, or
a number of REs which are capable of transmitting the ePDCCHs in an eCCE in the subframe.

5. The method according to claim 4, wherein
the first type of parameter at least further comprises a Distributed/Localized (D/L) type of the Set i; or
the first type of parameter at least further comprises a D/L type of the K ePDCCH resource sets; or
the first type of parameter at least further comprises a value of N of the Set i; or
the first type of parameter at least further comprises a value of N of the K ePDCCH resource sets; or
the first type of parameter at least further comprises a value of N and a D/L type of an ePDCCH resource set of the Set i; or
the first type of parameter at least further comprises a value of N of the K ePDCCH resource sets and a D/L type of the K ePDCCH resource sets; or
the first type of parameter at least further comprises high layer signaling for allocating the number of blind detections or a number of ePDCCH candidates; or
the first type of parameter at least further comprises a number of enhanced Resource Element Groups (eREG) contained in an enhanced Control Channel Element (eCCE) in the subframe,
wherein N is an aggregation level.

6. A method for detecting control signaling, comprising:
detecting, by a terminal, control signaling in K enhanced Physical Downlink Control channel (ePDCCH) resource sets in a subframe, wherein K is an integer greater or equal to 1,
detecting a number of ePDCCHs by the terminal in Set i of the K ePDCCH resource sets, wherein the number of ePDCCH resource sets is X(i), i is an integer, and 0<i<=K, at least one of the X(i) is determined according to a first type of parameter, and the first type of parameter at least comprises high layer signaling for allocating the number of blind detections; and
wherein the first type of parameter comprises at least one of
a subframe type,
an encoding rate corresponding to a Downlink Control Information Format (DCI Format) in the subframe,
a number of Resource Elements (RE) which are capable of transmitting the ePDCCHs in a Physical Resource Block (PRB) pair in the subframe, or
a number of REs which are capable of transmitting the ePDCCHs in an eCCE in the subframe.

7. A device for detecting control signaling, configured to detect control signaling in K enhanced Physical Downlink Control channel (ePDCCH) resource sets in a subframe; wherein K is an integer greater or equal to 1,
detecting a number of ePDCCHs by the device in Set i of the K ePDCCH resource sets, wherein the number of ePDCCH resource sets is X(i), i is an integer, and 0<i<=K, at least one of the X(i) is determined according to a first type of parameter, and the first type of parameter at least comprises a value of K or comprises the value of K and an index i of the K ePDCCH resource sets, and wherein the first type of parameter comprises at least one of a subframe type, an encoding rate corresponding to a Downlink Control Information Format (DCI Format) in the subframe, a number of Resource Elements (RE) which are capable of transmitting the ePDCCHs in a Physical Resource Block (PRB) pair in the subframe, and a number of REs which are capable of transmitting the ePDCCHs in an eCCE in the subframe.

8. The device according to claim 7, wherein the first type of parameter at least comprises the value of K, the index i, and a value of N of the K ePDCCH resource sets; or the first type of parameter at least comprises the value of K, the index i, and a value of N of the Set i; or the first type of parameter at least comprises the value of K, the index i, and a configuration of a Distributed/Localized (D/L) type of the K ePDCCH resource sets; or the first type of parameter at least comprises the value of K, the index i, and a configuration of a D/L type of the Set i; or the first type of parameter at least comprises the value of K, the index i, a D/L type corresponding to the K ePDCCH resource sets, and a value of N of the K ePDCCH resource sets, wherein N is an aggregation level.

9. The device according to claim 8, wherein the first type of parameter further comprises high layer signaling for allocating the number of blind detections or a number of ePDCCH candidates; or the first type of parameter further comprises a number of enhanced Resource Element Groups (eREG) contained in an enhanced Control Channel Element (eCCE) in the subframe; or the first type of parameter further comprises an Aggregation Level (AL) needed to be detected in the Set i, or an AL needed to be detected in the K ePDCCH resource sets.

10. A device for detecting control signaling, configured to detect control signaling in K enhanced Physical Downlink Control channel (ePDCCH) resource sets in a subframe, wherein K is an integer greater or equal to 1;

detecting a number of ePDCCHs by the device in Set i of the K ePDCCH resource sets, wherein the number of ePDCCH resource sets is X(i), i is an integer, and 0<i<=K, at least one of the X(i) is determined according to a first type of parameter, and the first type of parameter at least comprises an Aggregation Level (AL) set detected in the Set i or detected AL sets separately corresponding to the K ePDCCH resource sets, and wherein the first type of parameter comprises at least one of a subframe type, an encoding rate corresponding to a Downlink Control Information Format (DCI Format) in the subframe, a number of Resource Elements (RE) which are capable of transmitting the ePDCCHs in a Physical Resource Block (FRB) pair in the subframe, or a number of REs which are capable of transmitting the ePDCCHs in an eCCE in the subframe.

11. The device according to claim 10, wherein the first type of parameter at least further comprises a Distributed/Localized (D/L) type of the Set i; or the first type of parameter at least further comprises a D/L type of the K ePDCCH resource sets; or the first type of parameter at least further comprises a value of N of the Set i; or the first type of parameter at least further comprises a value of N of the K ePDCCH resource sets; or the first type of parameter at least further comprises a value of N and a D/L type of an ePDCCH resource set of the Set i; or the first type of parameter at least further comprises a value of N of the K ePDCCH resource sets and a D/L type of the K ePDCCH resource sets; or the first type of parameter at least further comprises high layer signaling for allocating the number of blind detections or a number of ePDCCH candidates; or the first type of parameter at least further comprises number of enhanced Resource Element Groups (eREG) contained in an enhanced Control Channel Element (eCCE) in the subframe, wherein N is an aggregation level.

12. A device for detecting control signaling, configured to detect control signaling in K enhanced Physical Downlink Control channel (ePDCCH) resource sets in a subframe, wherein K is an integer greater or equal to 1;

detecting a number of ePDCCHs by the device in Set i of the K ePDCCH resource sets, wherein the number of ePDCCH resource sets is X(i), i is an integer, and 0<i<=K, at least one of the X(i) is determined according to a first type of parameter, and the first type of parameter at least comprises high layer signaling for allocating the number of blind detections; and wherein the first type of parameter comprises at least one of a subframe type, an encoding rate corresponding to a Downlink Control Information Format (DCI Format) in the subframe, a number of Resource Elements (RE) which are capable of transmitting the ePDCCHs in a Physical Resource Block (FRB) pair in the subframe, and a number of REs which are capable of transmitting the ePDCCHs in an eCCE in the subframe.

* * * * *